March 11, 1952     S. J BUDLANE     2,588,352
INTERNAL-COMBUSTION HEATER
Filed Jan. 15, 1948                                3 Sheets-Sheet 1
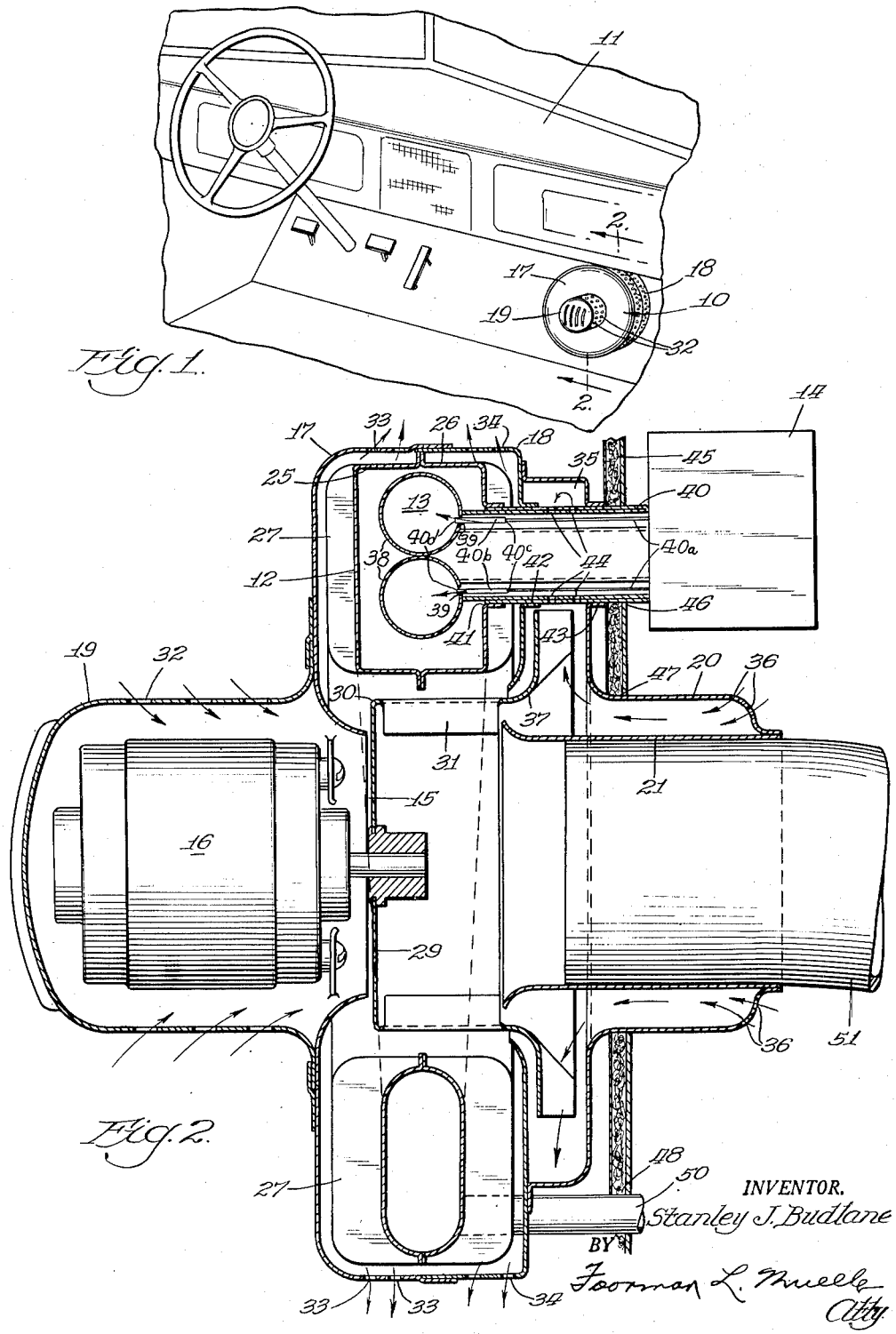

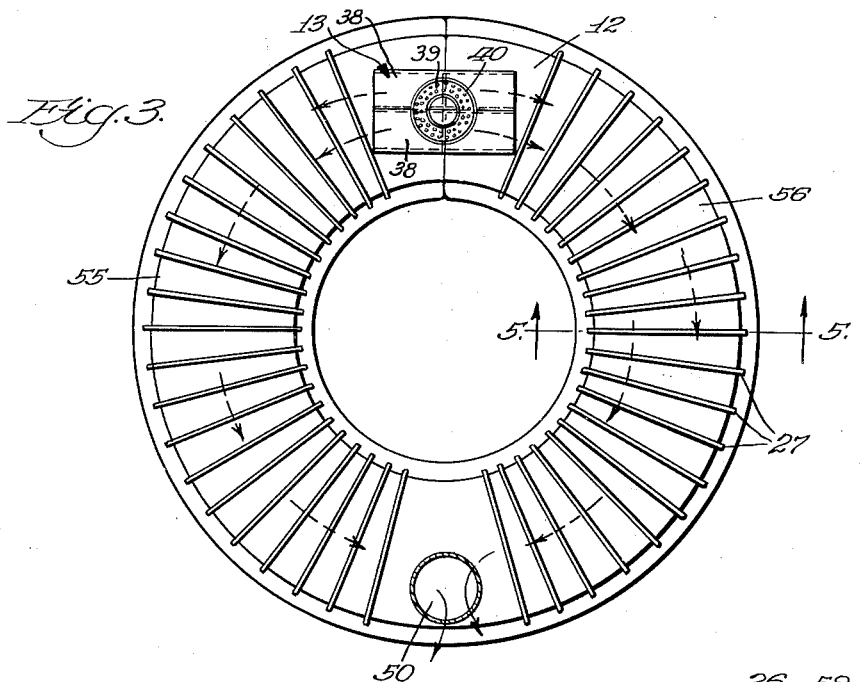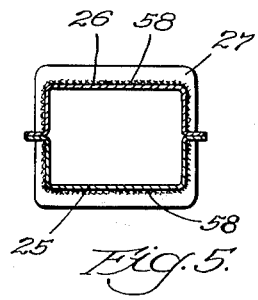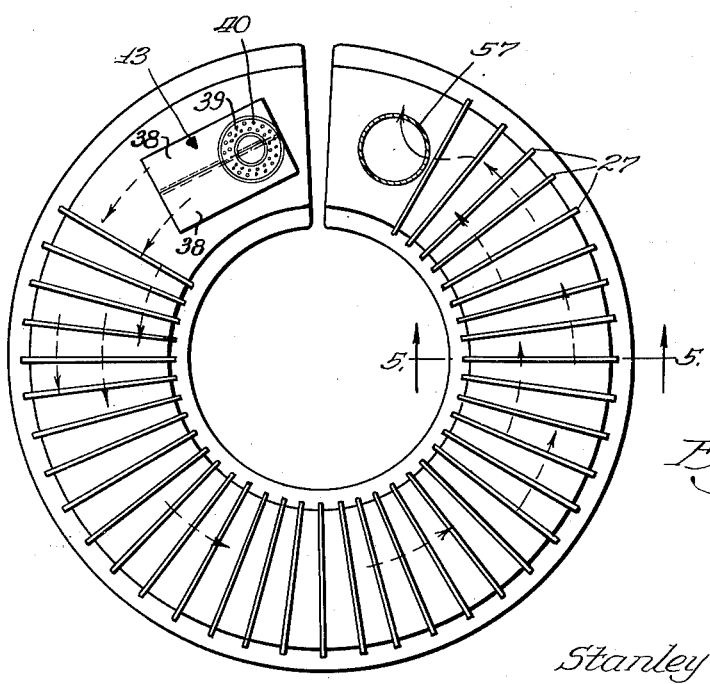

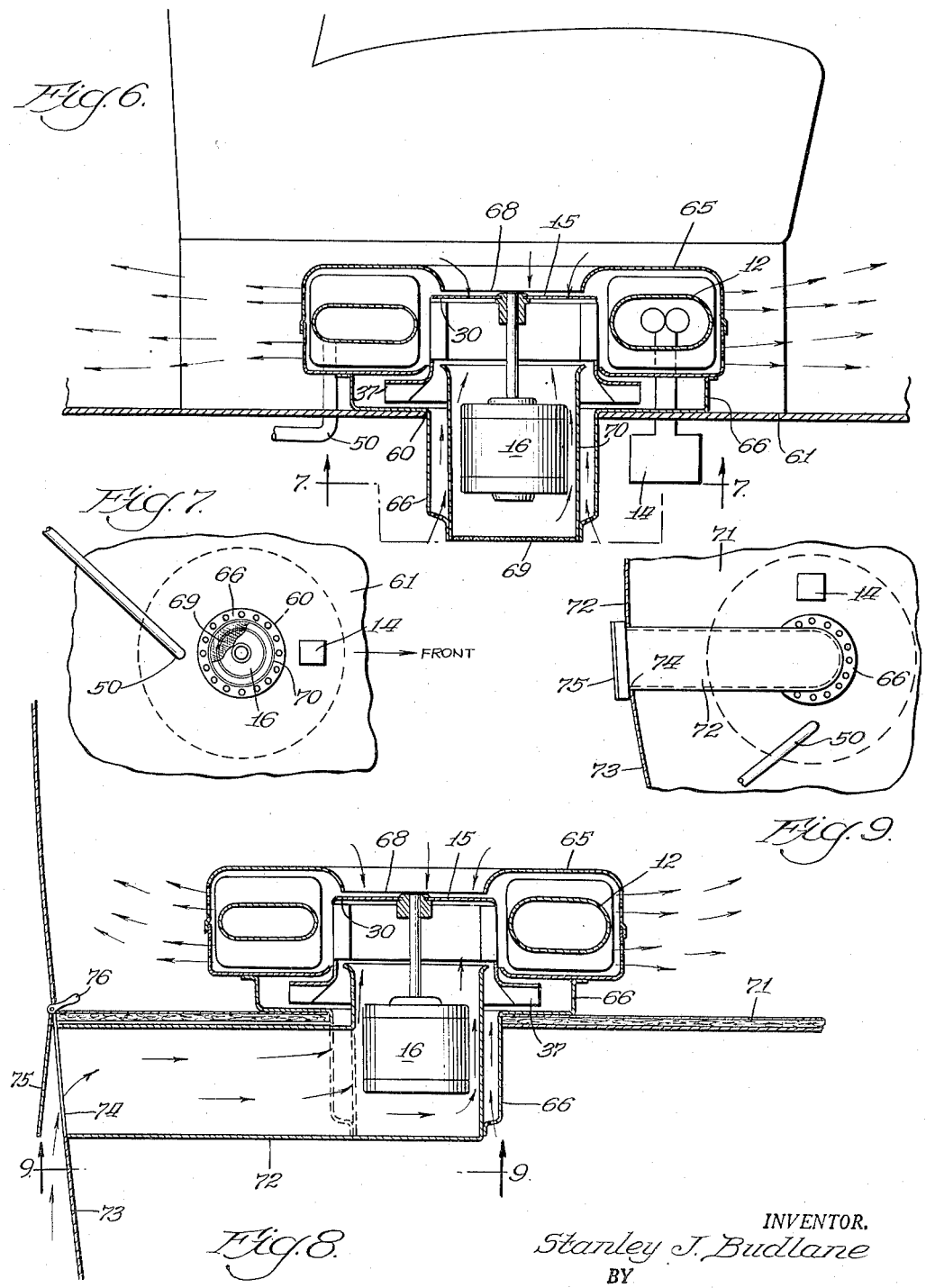

Patented Mar. 11, 1952

2,588,352

UNITED STATES PATENT OFFICE 2,588,352

INTERNAL-COMBUSTION HEATER

Stanley J. Budlane, Chicago, Ill., assignor to Motorola, Inc., Chicago, Ill., a corporation of Illinois Application January 15, 1948, Serial No. 2,439

5 Claims. (Cl. 126—110)

This invention relates generally to heating apparatus and more particularly to an internal combustion heater adapted for installation in automobiles and other vehicles and for general portable use.

In the prior art various attempts have been made to provide a small, compact and lightweight heater which is suitable for installation in automobiles and other vehicles. In these heaters it is desired that the structure be as simple and rugged as possible, that a large heat output be provided in very short time, and that the operation of the heater be substantially noise free. In order to provide operation at all times the heater must be entirely complete in itself and not be dependent upon operation of a vehicle engine or other equipment. Therefore, the heater must preferably be electrically operated and, for use in an automobile, must be capable of operation from the six volt vehicle battery. As the power which may be taken from a vehicle battery is limited due to the fact that the capacity of the battery is limited and that other parts of the automobile operate therefrom, the heater must be constructed to require as little electrical power as possible for operation.

A difficulty encountered in former heaters of this type is that a relatively long time is required for the heater to produce a large amount of heat. This is true because of the relatively large mass of the combustion chamber and heat exchanger of the heater which must be brought up to the operating temperature. Although sheet metal combustion chambers having relatively small masses have been used, it has been difficult to provide sufficient heat radiating area in such combustion chambers without the use of complicated and large structures.

It is, therefore, an object of the present invention to provide an improved internal combustion heater which is of simple, compact and lightweight construction.

It is a further object of this invention to provide an internal combustion heater having a lightweight sheet metal heat exchanger which provides rapid radiation of the heat developed thereby.

A still further object of this invention is the provision of an internal combustion heater adapted for installation in various positions in an automobile.

Another object of this invention is to provide a heater for an automobile in which a portion of the air heated is recirculated from the passenger compartment and the remainder of the air is taken from outside the automobile.

A feature of this invention is the provision of a compact heater structure having an annular combustion chamber and a combined fan structure for providing air for combustion and for circulating air to be heated.

A further feature of this invention is the provision of a heater having a lightweight combustion chamber comprising a stainless steel duct structure with aluminum fins secured thereto.

A still further feature of this invention is the provision of a heater structure in which air to be heated is circulated over the heat exchanger with a minimum of deflection so that the heater is fast in operation and is relatively noise free.

Still another feature of this invention is the provision of an air heater which has intake air passages on both sides of the combustion chamber so that the heater can be installed in various positions in an automobile and both air from inside the automobile and outside air can be heated and circulated.

Further objects, features and advantages will be apparent from a consideration of the following description taken in connection with the accompanying drawings in which:

Fig. 1 illustrates the heater in accordance with the invention installed on the cowl of an automobile;

Fig. 2 is a cross-sectional view of the heater showing the structure thereof;

Fig. 3 is a detailed view of the heat exchanger;

Fig. 4 illustrates a modified heat exchanger;

Fig. 5 is a cross-sectional view of the heat exchangers of Figs. 3 and 4;

Fig. 6 illustrates a modified heater adapted for installation under the seat of an automobile;

Fig. 7 is a view looking up at the heater of Fig. 6;

Fig. 8 illustrates a heater as shown in Fig. 6 installed on the cowl of an automobile; and Fig. 9 is a rear plan view of the heater of Fig. 8.

In accordance with the invention there is provided an internal combustion heater having an annular combustion chamber made of sheet metal with radiating fins secured thereto. For supplying air for combustion, an annular air supply chamber is positioned at the side of the combustion chamber. A burner unit for conditioning gasoline for burning and igniting the same is positioned in the combustion chamber and includes a portion which extends through the air supply chamber to obtain combustion air therefrom. For providing fuel for the burner unit a fuel supply system is provided which controls the quantity of fuel consumed. A unitary fan structure is provided having a portion positioned in the space surrounded by the combination chamber for circulating air over the combustion chamber and a portion positioned in the air supply chamber to provide the required air pressure for the burner. A housing is provided about the combustion chamber and the fan structure and includes duct means for allowing air to be taken from both sides of the heater and passed radially out over the combustion chamber. For driving the fan, a motor is provided which is positioned in one of the intake ducts for circulating air so that the motor will be cooled by the incoming air. The heater is adapted to be installed either on the cowl of an automobile or under the front seat thereof and is arranged so that intake air from one side of the heater may be from the passenger compartment providing recirculation and reheating thereof, and air taken in from the other side of the heater may be fresh air from outside of the automobile.

Referring now to the drawings, in Fig. 1 there is illustrated a heater 10 in accordance with the invention installed on the cowl of an automobile under the dash 11. This heater is shown more in detail in Fig. 2 as including a combustion chamber 12, a burner unit 13 therein, a fuel supply system 14 for the burner, a fan 15 and a motor 16 for driving the fan. A housing is provided for the heater comprising a pair of annular shells 17 and 18 which surround the combustion chamber, a cup-shaped member 19 over the motor, an annular shell 20 which forms the air supply chamber, and a tube 21 positioned inside the air supply chamber through which circulating air is introduced. As is apparent in Fig. 2 the combustion chamber 12 is formed of two annular troughs 25 and 26 which are welded together to form an annular duct. As the combustion chamber also functions as a heat exchanger, a plurality of fins 27 are secured to the duct to provide a large radiating surface.

The fan 15 includes a cup-shaped central portion 30 having the cylindrical surface thereof perforated to provide blades 31 which form a sirocco type fan. The bottom surface 29 is also perforated to allow entry of air from adjacent the motor 16. This fan when driven by the motor 16 causes air to be drawn in through openings 32 in the motor enclosure 19 and also through the tube 21 from the other side of the heater. This air is directed radially outward over the combustion chamber 12 and discharged through openings 33 and 34 in the shells 17 and 18, respectively. It is noted that the air is directed by the fan over the combustion chamber in substantially a straight line and is not substantially deflected by the enclosing housing so that the circulation of the air does not cause large disturbing noises.

For providing air for use in conditioning the fuel and for combustion thereof, an air supply chamber 35 is provided which is defined by the shells 18 and 20 and tube 21. Openings 36 are provided in the shell 20 to allow air to enter the chamber 35. The fan 15 includes a flared skirt portion 37 integral with the cup-shaped portion 30 which extends outwardly into the air supply chamber 35. This skirt 37 is of such configuration to form a sirocco type fan which, when driven by the motor, causes air to be drawn through the openings 36 and pressures to be built up in the air supply chamber 35. The burner 13 is connected to the fuel supply system 14 by tube 40 which extends through an opening 41 in the trough 26, opening 42 in the shell 18, and opening 43 in the shell 20. Included in the burner 13 are two short open-ended tubes 38 of stainless steel or other suitable material which are disposed in adjoining relation near the intake opening 41. The tube 40 is a composite tube composed of two concentric portions which define an annular passageway. This passageway communicates with the interiors of the tubes 38 (which are in transverse relation to the tube 40) through perforations 39 in the tubes 38. The portion of the tube 40 which extends through the air supply chamber 35 includes openings 44 in the outer member thereof through which the aforesaid annular passageway receives air from the air supply chamber 35, and supplies this air to the burner 13 in combustion chamber in the following manner. The annular area defined by tube 40 contains a plurality of fuel supply lines 40a positioned therein which lead from the fuel supply unit 14 and terminate in larger diameter lines 40b. The shoulders 40c formed by junction of lines 40a and 40b have a plurality of orifices formed therein which provide combustion air to line 40b. This air mixes with the fuel supplied by line 40a in much the same fashion as mixing takes place in the chamber of Patent No. 2,286,853, to H. B. Holthouse. This mixture is supplied by line 40b to burner 13 where it is ignited and burned along with secondary combustion air supplied by orifices 40d in the end of the annular area defined by tube 40. It is to be noted that while this particular means for supplying fuel to the burner assembly has been described, the invention is to be in no way concerned with a fuel supply system of this type. Other known systems for supplying fuel to the burner assembly would operate equally well, and could be easily adapted for use in the invention.

As illustrated in Fig. 2, when the heater is installed on the fire wall 45 of an automobile, the fire wall has an opening 46 through which the fuel supply tube 40 extends, a large opening 47 for the inlet to the air supply chamber and an opening 48 for an exhaust outlet 50. It is seen that when the heater is installed in this manner air from within the passenger compartment of the automobile is drawn through openings 32 in the enclosing cup for the motor and additional air is drawn in through the tube 21, with the two air streams being combined by fan 30 and directed out over the combustion chamber 12. By properly proportioning the openings 32 through which air from the automobile enters this heater, and the tube 21 through which fresh air enters, the proportion of fresh and recirculated air can be regulated as desired. The heated air is discharged from the heater through the openings 33 and 34 and then circulates through the passenger compartment. A flexible hose 51 may be connected to the tube 21 so that intake air may be received from any desired point such as from adjacent the radiator of the automobile. The combustion air is drawn in through openings 36 in the shell 20 which is positioned in the motor compartment in the installation shown to provide air from combustion in the chamber 35.

In Fig. 3 there is shown more in detail the combustion chamber 12. In this figure it is apparent that the combustion chamber is divided into two semi-circular sections 55 and 56. The burner 13 is positioned in the chamber with the ports directed so that burning takes place in both sections of the combustion chamber. The burning gases then continue around the two sides of the combustion chamber and are exhausted through the outlet 50. The details of the burner are not shown as they do not constitute a part of this invention. The combustion chamber may be made of any suitable sheet metal being preferably made of stainless steel. The fins 27 may be made of aluminum or other material and may be secured to the stainless steel duct by well known welding processes. An alternate configuration which the combustion chamber may take is illustrated in Fig. 4. In this structure a single path for burning fuel is provided by a C-shaped structure with the burner 13 positioned in one end of the chamber. The burning gases traverse the combustion chamber until the end is reached where the burned gases are exhausted through the outlet 57. The construction of the combustion chamber may be substantially the same as in the modification of Fig. 3 with the body being preferably made of stainless steel and the fins 27 made of aluminum and welded thereon in a well known manner. Fig. 5 illustrates a typical cross section of the combustion chambers shown in Figs. 3 and 4 with the welded seams indicated at 58.

In Fig. 6 there is illustrated a modified heater structure which is adapted to be mounted under the seat of an automobile. As is apparent, the structure is generally similar to that of Fig. 2, including a combustion chamber 12, fan 15 and motor 16. The motor is reversed, being positioned in the fresh air stream, to thereby provide a relatively thin structure as is necessary for positioning in the relatively small space available under the seat of an automobile. The heater is installed in an opening 60 in the floor boards 61 of an automobile. A housing 65 is provided about the combustion chamber and a cup-shaped member 66 extending in the opening 60 provides an air supply chamber all generally similar to the structure of Fig. 2. The fan 15 is identical to that in the prior modification and includes a cup-shaped portion 30 for circulating air over the combustion chamber and a skirt 37 for providing pressure in the air supply chamber. Air from within the passenger compartment enters the heater through opening 68 in the housing 65 and fresh air is provided through a screen 69 which admits air to the tube 70 extending within the cup-shaped member 66. A lead-in duct may be connected to the tube 70 to admit fresh air from any part of the vehicle as desired with the air being drawn in by the portion 30 of the fan over the motor 16 through tube 70. Fig. 7 is a view looking up at the heater from underneath the car and shows the relative position of the tube 70, the fuel feeding means 14 and the exhaust outlet 50. This structure is also arranged in substantially the same manner as illustrated in Fig. 2.

Figs. 8 and 9 illustrate a modified heater structure which is generally similar to that of Fig. 6 but which is illustrated as mounted on the fire wall 71 of the vehicle. As the structure is substantially identical to that of Fig. 6 it will not be described in detail. In this construction a fresh air conduit 72 is provided which extends from adjacent the fan 30 to the side wall 73 of the automobile body. An opening 74 is provided in this wall of the automobile body to allow entry of outside air. A cover 75 may be provided for this opening 74 which can be controlled from inside the vehicle by the handle 76 in the manner of the usual cowl ventilator. Alternatively, louvers may be provided in the wall 73 of the automobile body which would be effective to prevent entry of foreign matter into the heater and yet allow substantially unrestricted flow of air therethrough. This heater structure is arranged to recirculate air from inside the automobile and use only part fresh air as in the previous modifications.

The heater as above described provides a very lightweight and compact structure which is very rapid and quiet in operation. As the combustion chamber is made entirely of sheet metal it attains operating temperature very rapidly. The passage of air over the combustion chamber by the circulating air portion of the fan is so arranged that the air is free to flow in substantially straight lines thereby eliminating noise normally produced by deflection of the air stream. The radiating fins are integrally secured to the duct portion of the combustion chamber so that the heat is rapidly conducted thereto and the air passing over the combustion chamber is very rapidly heated.

As the heater recirculates air from inside the automobile and also heats fresh air, an ideal arrangement is provided. The air from inside the automobile is relatively warm and does not require as much heating capacity to keep the air at the desired temperature. The entry of fresh air provides enough moisture to keep the air inside the automobile in good condition and prevents stuffiness. In accordance with the invention, this feature can be provided by relatively simple structures which can be installed in various positions in the automobile.

While I have disclosed certain satisfactory embodiments of my invention, it is apparent that various changes and modifications can be made therein without departing from the intended scope of the invention as defined in the appended claims.

I claim:

1. An internal combustion heater comprising an annular duct means defining an annular combustion chamber, a first shell housing said combustion chamber, a second shell adjoining said first shell on one side thereof, said second shell defining an annular air supply chamber, a unitary fan structure including a first portion disposed in the space surrounded by said combustion chamber for circulating air to be heated over said combustion chamber and a second portion in said annular air supply chamber to provide circulation of air for combustion, a motor for driving said fan, a housing for said motor secured to said first shell on the side thereof opposite the side on which said second shell is positioned and having air intake openings therein to provide an intake air duct about said motor for air to be heated, said first shell having an air intake portion communicating with said intake air duct, and an outlet portion for air heated by said combustion chamber, said second shell having an air inlet portion, a second air duct extending through said second shell to the air intake portion of said first shell, a fuel burner in said combustion chamber, means for supplying fuel to said burner, and an air tube communicating with the interior of said second shell and extending to said burner for supplying combustion air thereto.

2. A compact heat transfer mechanism including in combination, an annular heat exchange unit having a duct therein, a first annular shell about said heat exchange unit having intake and discharge openings therein and providing a passage for the flow of air radially through said shell about said heat exchange unit, a second annular shell adjacent said first shell on one side thereof forming an air supply chamber having an inlet opening, means providing a passage between said air supply chamber and said duct in said heat exchange unit, and a unitary fan structure having a central fan portion and a skirt fan portion integral with said central portion and extending outwardly from the outer edge thereof, said central fan portion being disposed in the space surrounded by said first shell for providing a flow of air radially outwardly therefrom through said first shell, said skirt portion extending into said chamber within said second shell and being of such configuration to form a second fan portion for providing a flow of air through said air supply chamber and into said heat exchange unit.

3. A compact heat transfer mechanism including in combination, a heat exchange unit having a duct therein, a first shell about said heat exchange unit having openings on opposite sides thereof for intake of air to be heated and having at least one discharge opening remote from said intake openings, a second annular shell adjacent said first shell on one side thereof about said intake opening therein, said second shell defining a chamber therein having an inlet opening, means providing a passage between said chamber and said duct of said heat exchange unit, and a unitary circulating fan structure having a central fan portion and an outer fan portion integral with said central portion and extending outwardly therefrom, said central fan portion being disposed within said first shell for providing a flow of air therethrough from said intake openings about said heat exchange unit and out said discharge opening, said outer fan portion extending into said chamber within said second shell and being of such configuration to form a second fan portion for providing a flow of gas from said inlet opening through said chamber and said heat exchange unit.

4. A heat transfer mechanism in accordance with claim 3 including means forming an intake duct extending from said intake opening on one side of said first shell for entry of air therethrough, and including motor means positioned within said intake duct for driving said fan structure.

5. A heat transfer mechanism in accordance with claim 3 in which said second shell forms an intake duct at said opening on said one side of said first shell for entry of air therethrough, and including motor means positioned within said intake duct for driving said fan structure.

STANLEY J. BUDLANE.

REFERENCES CITED

The following references are of record in the file of this patent:

UNITED STATES PATENTS

| Number | Name | Date |
|---|---|---|
| 2,179,041 | Hoffman | Nov. 7, 1939 |
| 2,236,475 | Findley | Mar. 25, 1941 |
| 2,286,853 | Holthouse | June 16, 1942 |
| 2,318,393 | Honerkamp et al. | May 4, 1943 |
| 2,342,872 | LeFevre et al. | Feb. 29, 1944 |
| 2,383,650 | Hess | Aug. 28, 1945 |
| 2,453,913 | Higley | Nov. 16, 1948 |
| 2,474,687 | Parrish | June 28, 1949 |
| 2,488,548 | MacCracken | Nov. 22, 1949 |
| 2,501,627 | Findley | Mar. 21, 1950 |